United States Patent
Chuang (10) Patent No.: US 8,363,713 B2
(45) Date of Patent: Jan. 29, 2013

(54) METHOD AND APPARATUS FOR LOADING IMAGE DATA

(75) Inventor: Yu-Ting Chuang, Kao-Hsiung Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1491 days.

(21) Appl. No.: 11/308,118

(22) Filed: Mar. 7, 2006

(65) Prior Publication Data
US 2006/0203908 A1    Sep. 14, 2006

(30) Foreign Application Priority Data
Mar. 8, 2005 (TW) ................................ 94106944 A (51) Int. Cl.
*H04N 7/12* (2006.01)
*H04N 11/02* (2006.01)
*H04N 11/04* (2006.01)
(52) U.S. Cl. .............................. 375/240.01; 375/240.12
(58) Field of Classification Search ............. 375/240.16, 375/240.01
See application file for complete search history.

(56) References Cited

U.S. PATENT DOCUMENTS

| | | | | |
|---|---|---|---|---|
| 5,153,720 A * | 10/1992 | Kawai | ...................... | 348/416.1 |
| 5,351,083 A * | 9/1994 | Tsukagoshi | ................ | 348/384.1 |
| 6,430,317 B1 * | 8/2002 | Krishnamurthy et al. | .... | 382/236 |
| 6,489,995 B1 * | 12/2002 | Kok et al. | ................... | 348/416.1 |
| 7,342,964 B2 * | 3/2008 | Gallant et al. | ........... | 375/240.16 |
| 7,440,500 B2 * | 10/2008 | Pearson et al. | ........... | 375/240.16 |
| 2003/0053544 A1 * | 3/2003 | Yasunari et al. | ......... | 375/240.16 |
| 2004/0095998 A1 * | 5/2004 | Luo et al. | ................. | 375/240.16 |
| 2005/0008077 A1 * | 1/2005 | Weatherspoon | ......... | 375/240.24 |
| 2005/0286633 A1 * | 12/2005 | Abel et al. | ............... | 375/240.16 |
| 2006/0140277 A1 * | 6/2006 | Ju | ............................ | 375/240.25 |
| 2006/0188021 A1 * | 8/2006 | Suzuki et al. | ............. | 375/240.16 |
| 2006/0203908 A1 * | 9/2006 | Chuang | ..................... | 375/240.12 |
| 2007/0035643 A1 * | 2/2007 | Hashimoto et al. | ........... | 348/246 |
| 2008/0063074 A1 * | 3/2008 | Gallant et al. | ........... | 375/240.16 |
| 2008/0112488 A1 * | 5/2008 | Pearson et al. | ........... | 375/240.16 |
| 2009/0034854 A1 * | 2/2009 | Lee et al. | ...................... | 382/236 |

OTHER PUBLICATIONS

"VLSI Circuit Design of Motion Estimation Unit for Full-Search Block Matching" Jul. 2003, pp. I-IX, 1-66.

* cited by examiner

*Primary Examiner* — David Ometz
*Assistant Examiner* — Santiago Garcia
(74) *Attorney, Agent, or Firm* — McClure, Qualey & Rodack, LLP (57) ABSTRACT

A method for loading image data required by a motion estimation into a storage medium, the method includes: determining if an overlap portion between a current search range and a previous search range exists; and if the overlap portion exists; keeping image data corresponding to the overlap portion stored in the storage medium; identifying a non-overlap portion between the current search range and the previous search range; dividing the non-overlap portion into at least one sub-block; and loading image data corresponding to each sub-block into the storage medium for utilization by the motion estimation.

20 Claims, 6 Drawing Sheets

| Overlap schemes | Comparing result of boundary values | Number of sub-blocks | Boundary values of each sub-blocks |
|---|---|---|---|
| 4A | CSY≤PSY,CEY≥PEY,CSX<PSX,CEX≥PEX | 1 | #1 : (CSY,CEY,CSX,PSX) |
| 4B | CSY≤PSY,CEY≥PEY,CSX,CEX≥PSX,CEX≥PEX | 1 | #1 : (CSY,CEY,PEX,CEX) |
| 4C | CSY>PSY,CEY≥PEY,CSX≥PSX,CEX≥PEX | 1 | #1 : (CSY,PSY,CSX,CEX) |
| 4D | CSY≤PSY,CEY<PEY,CSX≥PSX,CEX≥PEX | 1 | #1 : (PEY,CEY,CSX,CEX) |
| 4E | CSY>PSY,CEY≥PEY,CSX<PSX,CEX≥PEX | 2 | #1 : (CSY,CEY,CSX,PSX) #2 : (CSY,PSY,PSX,CEX) |
| 4F | CSY>PSY,CEY≥PEY,CSX,CEX≥PSX,CEX≥PEX | 2 | #1 : (CSY,PSY,CSX,PEX) #2 : (CSY,CEY,PSX,CEX) |
| 4G | CSY≤PSY,CEY<PEY,CSX<PSX,CEX≥PEX | 2 | #1 : (CSY,CEY,CSX,PSX) #2 : (PEY,CEY,PSX,CEX) |
| 4H | CSY≤PSY,CEY<PEY,CSX,CEX≥PSX,CEX≥PEX | 2 | #1 : (PEY,CEY,CSX,PEX) #2 : (CSY,CEY,PEX,CEX) |
| 4I | CSY>PSY,CEY<PEY,CSX≥PSX,CEX≥PEX | 2 | #1 : (CSY,PSY,CSX,CEX) #2 : (PEY,CEY,CSX,CEX) |
| 4J | CSY≤PSY,CEY<PEY,CSX≥PSX,CEX≥PEX | 2 | #1 : (CSY,CEY,CSX,PSX) #2 : (CSY,CEY,PEX,CEX) |
| 4K | CSY>PSY,CEY<PEY,CSX<PSX,CEX≥PEX | 3 | #1 : (CSY,CEY,CSX,PSX) #2 : (CSY,PSY,PSX,CEX) #3 : (CSY,CEY,PEX,CEX) |
| 4L | CSY≤PSY,CEY<PEY,CSX<PSX,CEX≥PEX | 3 | #1 : (CSY,CEY,CSX,PSX) #2 : (PEY,CEY,PSX,CEX) #3 : (CSY,CEY,PEX,CEX) |
| 4M | CSY>PSY,CEY<PEY,CSX<PSX,CEX≥PEX | 3 | #1 : (CSY,CEY,CSX,PSX) #2 : (CSY,PSY,PSX,CEX) #3 : (PEY,CEY,PSX,CEX) |
| 4N | CSY>PSY,CEY<PEY,CSX,CEX≥PSX,CEX≥PEX | 3 | #1 : (CSY,PSY,CSX,PEX) #2 : (PEY,CEY,CSX,PEX) #3 : (CSY,CEY,PEX,CEX) |
| 4O | CSY>PSY,CEY<PEY,CSX<PSX,CEX≥PEX | 4 | #1 : (CSY,CEY,CSX,PSX) #2 : (CSY,PSY,PSX,PEX) #3 : (PEY,CEY,PSX,PEX) #4 : (CSY,CEY,PEX,CEX) |
| 4P | CSY≥PSY,CEY≥PEY,CSX≥PSX,CEX≥PEX | 0 | No sub-blocks |

Fig. 6

METHOD AND APPARATUS FOR LOADING IMAGE DATA

BACKGROUND OF THE INVENTION

1. Field of the Invention

The present invention relates to an image processing technique, and more particularly, to a motion estimation method and related device.

2. Description of the Prior Art

Moving pictures include a series of static pictures. Usually, similar blocks will exist within two successive static pictures. Therefore, image data can be compressed by utilizing this property to reduce the amount of data to be transmitted.

When a prior art MPEG image data compression standard is employed to compress a current block in a current picture, a motion estimation operation is performed to search for a reference block that is most similar to the current block from a previous picture or a next picture. According to a result of the motion estimation operation, a motion vector of the current block is determined.

The above-mentioned motion estimation is typically realized by utilizing a block matching operation, for example, a full search block-matching scheme. A conventional block matching method performs a block matching operation within a search range corresponding to the current block. After completing the matching operation and obtaining a motion estimation of the current block, image data corresponding to the search range of a next block is loaded and a motion estimation operation continues similarly for the next block.

However, the prior art block matching method not only wastes many resources when in operation, but also requires considerable memory bandwidth for loading of the image data. As a result, the prior art method tends to negatively influence the normal operation of other devices and decreases the system efficiency for image processing.

SUMMARY OF THE INVENTION

It is therefore one of the objectives of the claimed invention to provide a method and device for loading image data, to solve the above-mentioned problems.

The claimed invention provides a method for loading image data required by a motion estimation operation. The method includes: determining if an overlap portion between a current search range and a previous search range exists; and if the overlap portion exists, keeping image data corresponding to the overlap portion stored in the storage medium; identifying a non-overlap portion between the current search range and the previous search range; dividing the non-overlap portion into at least one sub-block; and loading image data corresponding to each sub-block into the storage medium for the motion estimation.

The claimed invention further provides a data-loading device of a motion estimation device for loading image data into a storage medium of a motion estimation device. The data-loading device comprises: an overlap detector for determining if an overlap portion between a current search range and a previous search range exists; an area divider coupled to the overlap detector for dividing a non-overlap portion between the current search range and the previous search range into at least one sub-block if the overlap portion exists; and a loading module coupled to the area divider and the storage medium for loading image data corresponding to each sub-block into the storage medium so that the motion estimation device can perform a motion estimation operation according to the data in the storage medium.

The claimed invention also provides a method for loading image data required by a motion estimation operation. The method comprises: determining if an overlap portion between a current search range and a previous search range exists; if the overlap portion exists, identifying a non-overlap portion between the current search range and the previous search range; and loading image data corresponding to a portion of the current search range for the motion estimation, wherein the portion includes the non-overlap portion.

The claimed invention further provides a data-loading device of a motion estimation device. The data-loading device is capable of loading image data into a storage medium and the data-loading device comprises: an overlap detector for determining if an overlap portion between a current search range and a previous search range exists; an area divider coupled to the overlap detector for dividing a non-overlap portion between the current search range and the previous search range if the overlap portion exists; and a loading module coupled to the area divider and the storage medium for loading image data corresponding to a portion of the current search range into the storage medium, wherein the portion includes the non-overlap portion.

These and other objectives of the present invention will no doubt become obvious to those of ordinary skill in the art after reading the following detailed description of the preferred embodiment that is illustrated in the various figures and drawings.

DETAILED DESCRIPTION

Please note that the image data-loading method and related device disclosed in the present invention are applicable to various video encoding standards such as the MPEG series standards or Microsoft's WMV9 standard, etc.

Figure 1:
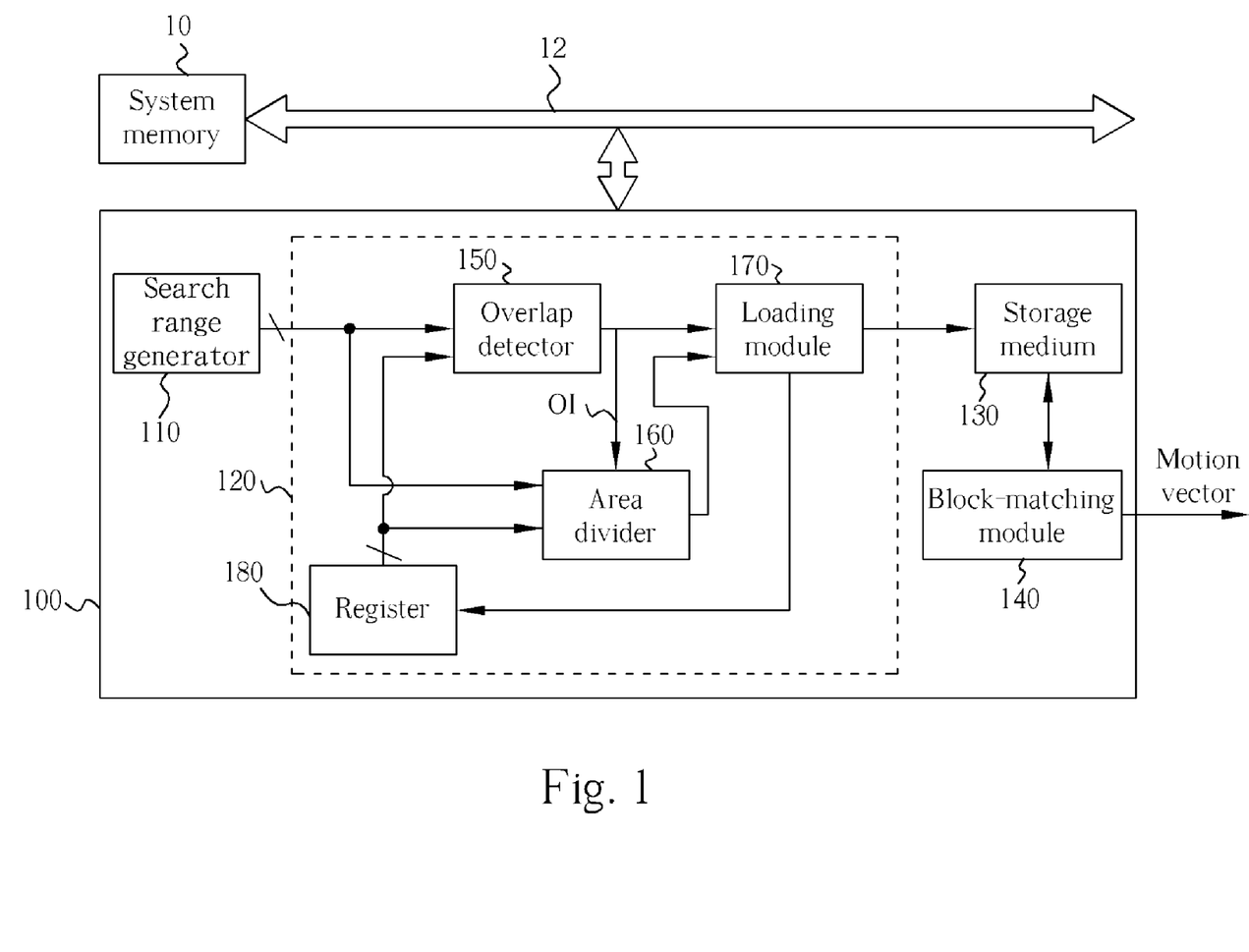
FIG. 1 is a block diagram illustrating a motion estimation device according to an embodiment of the present invention.

Please refer to FIG. 1. FIG. 1 is a block diagram illustrating a motion estimation device 100 according to an embodiment of the present invention. In the embodiment, when the motion estimation device 100 completes a motion estimation of a previous block PB, an image data of a search range PR corresponding to the previous block PB is buffered in a storage medium 130 and four boundary values PSY, PEY, PSX, PEX corresponding to an upper boundary, a lower boundary, a left boundary and a right boundary of the search range PR are also buffered in a register 180. When the motion estimation device 100 performs a motion estimation on a next block of the previous block PB (hereafter called current block, CB), the motion estimation device 100 uses a search range generator 110 to determine a current search range CR, corresponding to the current block CB, and outputs four boundary values CSY, CEY, CSX, CEX corresponding to an upper boundary, a lower boundary, a left boundary and a right boundary of the current search range CR to a data-loading device 120. The method to determine the current search range CR is well known in the art and further descriptions are omitted herein for brevity. In addition, the shape and the size of the current search range CR and the previous search range PR are not limited to specific schemes in practical implementations.

When the data-loading device 120 receives the four boundary values of the current search range CR, an overlap detector 150 determines if an overlap portion exists between the current search range CR and the previous search range PR according to the boundary values CSY, CEY, CSX, CEX and the boundary values PSY, PEY, PSX, PEX stored in the register 180. If no overlap portion is determined, the overlap detector 150 sends an overlap indicating signal OI, to cause a loading module 170 to read image data corresponding to the current search range CR from a system memory 10 through a memory bus 12 and load the image data into the storage medium 130. In this embodiment, the overlap indicating signal OI is a binary signal. The overlap indicating signal OI can be in either logic "HIGH" or logic "LOW" to control the loading module 170 or the area divider 160.

Then, a block-matching module 140 performs a block matching operation on the image data stored in the storage medium 130 for searching a reference block RB which is most similar to the current block CB in the current search range CR, and for generating a motion vector corresponding to the reference block RB. The operations and implementations of the block-matching module 140 are familiar to those skilled in the art and further descriptions are therefore omitted herein for brevity.

However, if an overlap portion between the current search range CR and the previous search range PR exists, then the overlap detector 150 sends the overlap indicating signal OI to control the area divider 160 to identify non-overlap portions between the current search range CR and the previous search range PR and to divide the non-overlap portion into at least one sub-block. The area divider 160 then transmits the information related to each sub-block (such as the boundary values of each sub-block) to the loading module 170. Since the area divider 160 does not transmit the information related to the overlap portion (such as the boundary values of the overlap portion) to the loading module 170, the loading module 170 can only read image data corresponding to each sub-block from the system memory 10 and then load the image data into the storage medium 130. The motion estimation device 100 will retain the image data corresponding to the overlap portion in the storage medium 130 and therefore, the storage medium 130 contains all of the image data in the current search range CR. Consequently, the block-matching module 140 is able to perform the block matching operation on the current block according to the image data stored in the storage medium 130. Meanwhile, the loading module 170 need not waste memory bandwidth to load the image data of the overlap portion.

It should be appreciated by those of ordinary skill in the art that any individual functionality of the above-mentioned motion estimation device 100 can be realized either on a single IC or on different circuit units.

Figure 2:
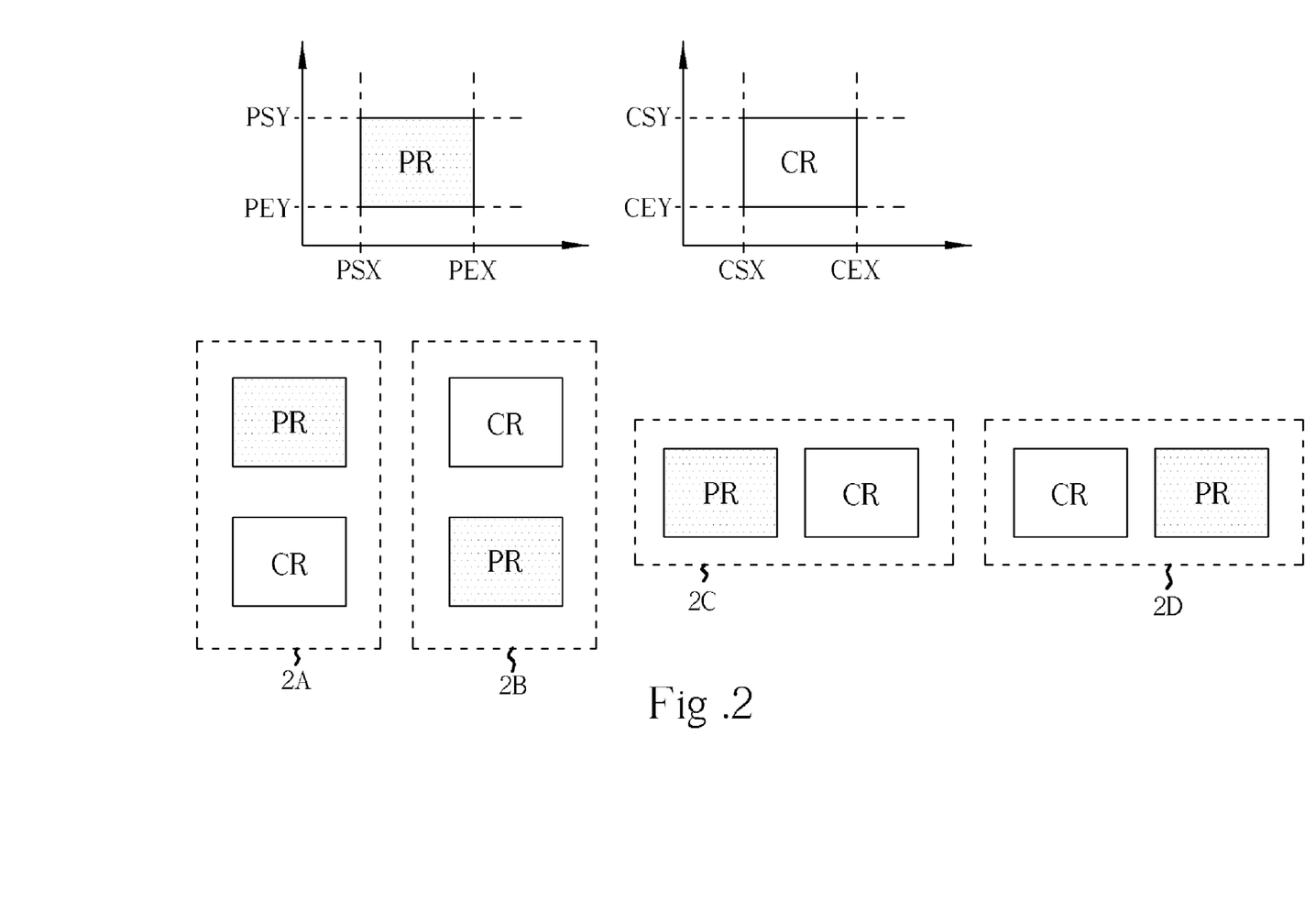
FIG. 2 is a diagram illustrating four non-overlap schemes between a current search range and a previous search range.

Please refer to FIG. 2. FIG. 2 is a diagram illustrating four non-overlap schemes between the current search range CR and the previous search range PR. In FIG. 2, a non-overlap scheme 2A represents the upper boundary CSY being smaller than the lower boundary PEY, a non-overlap scheme 2B represents the lower boundary CEY being greater than the upper boundary PSY, a non-overlap scheme 2C represents the left boundary CSX being greater than the right boundary PEX, and a non-overlap scheme 2D represents the right boundary CEX being smaller than the left boundary PSX. Thus, the overlap detector 150 can determine if an overlap portion between the current search range CR and the previous search range PR exists by comparing the opposite boundary sides of the current search range CR and the previous search range PR.

Figure 3:
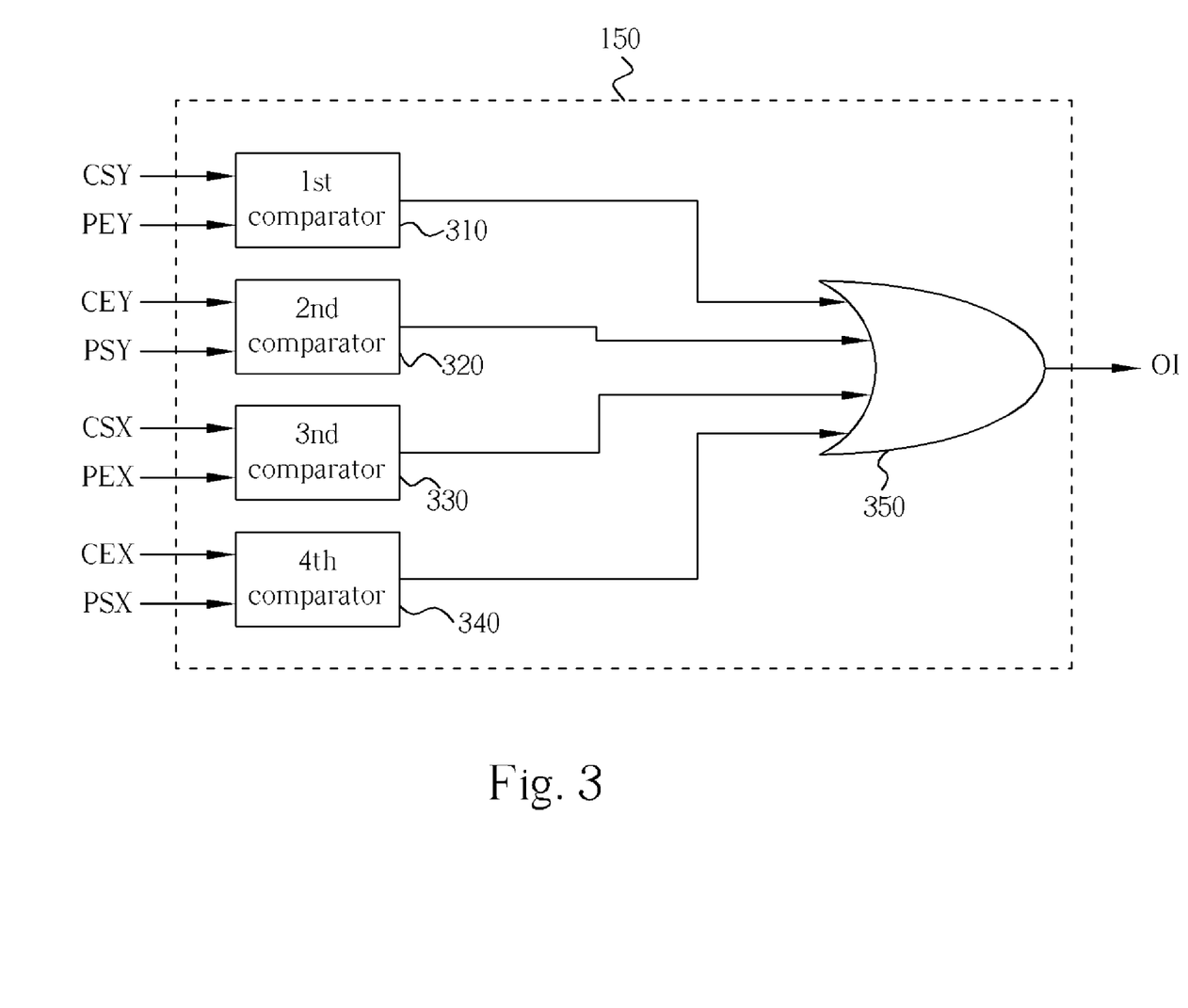
FIG. 3 is a block diagram of an overlap detector of FIG. 1 according to one embodiment of the present invention.

Please refer to FIG. 3. FIG. 3 is a block diagram of the overlap detector 150 according to one embodiment of the present invention. In this embodiment, the overlap detector 150 comprises a $1^{st}$ comparator 310 for comparing the upper boundary CSY of the current search range CR with the lower boundary PEY of the previous search range PR; a $2^{nd}$ comparator 320 for comparing the lower boundary CEY with the upper boundary PSY; a $3^{rd}$ comparator 330 for comparing the left boundary CSX with the right boundary PEX; a $4^{th}$ comparator 340 for comparing the right boundary CEX with the left boundary PSX; and a logic unit 350 for outputting the overlap indicating signal OI according to a plurality of comparing results of the comparators. In this embodiment, the logic unit 350 is an OR gate and other design choices may be utilized to realize the functionality of the logic unit 350.

Figure 4:
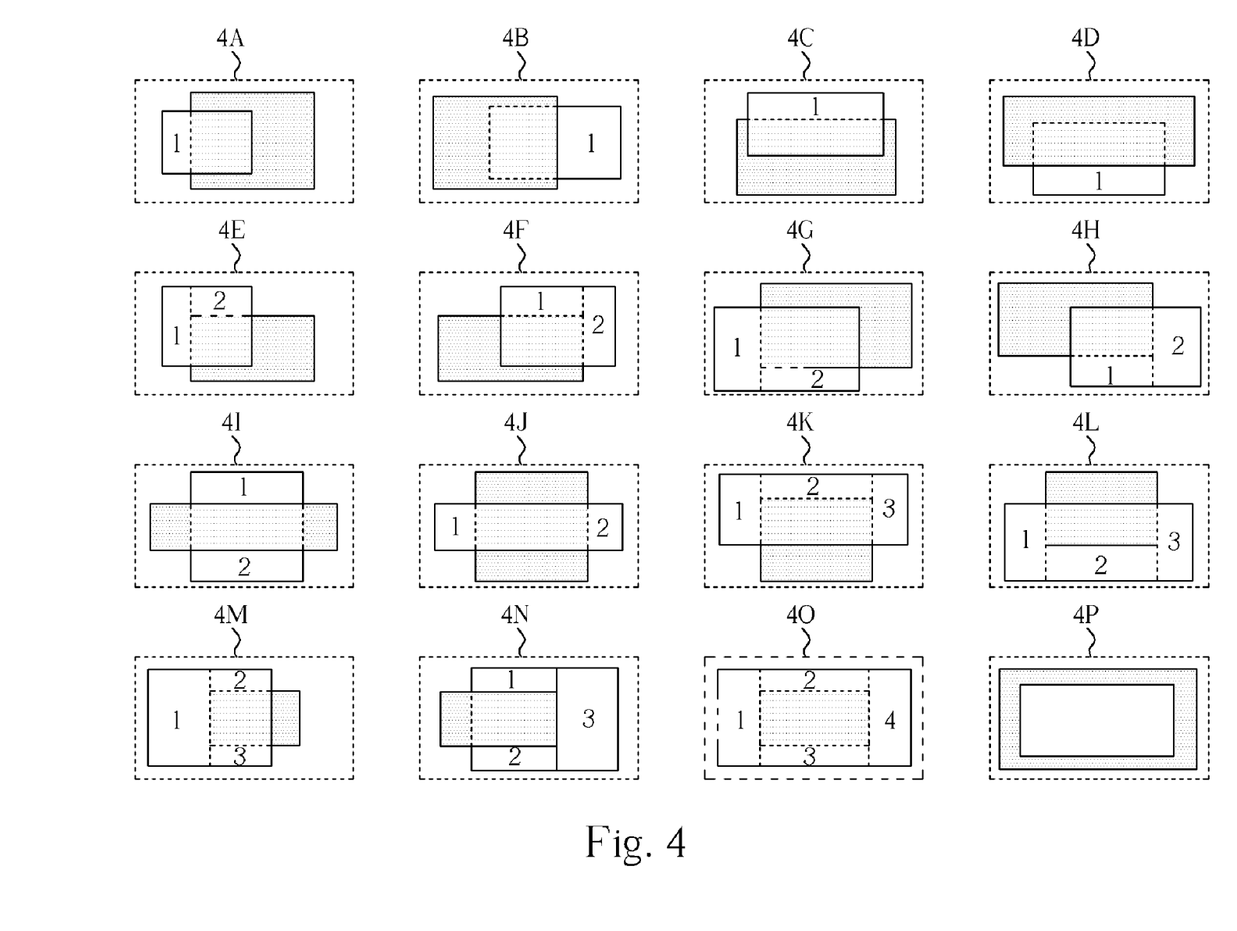
FIG. 4 is a diagram illustrating 16 overlap schemes between the current search range and the previous search range.
Figure 5:
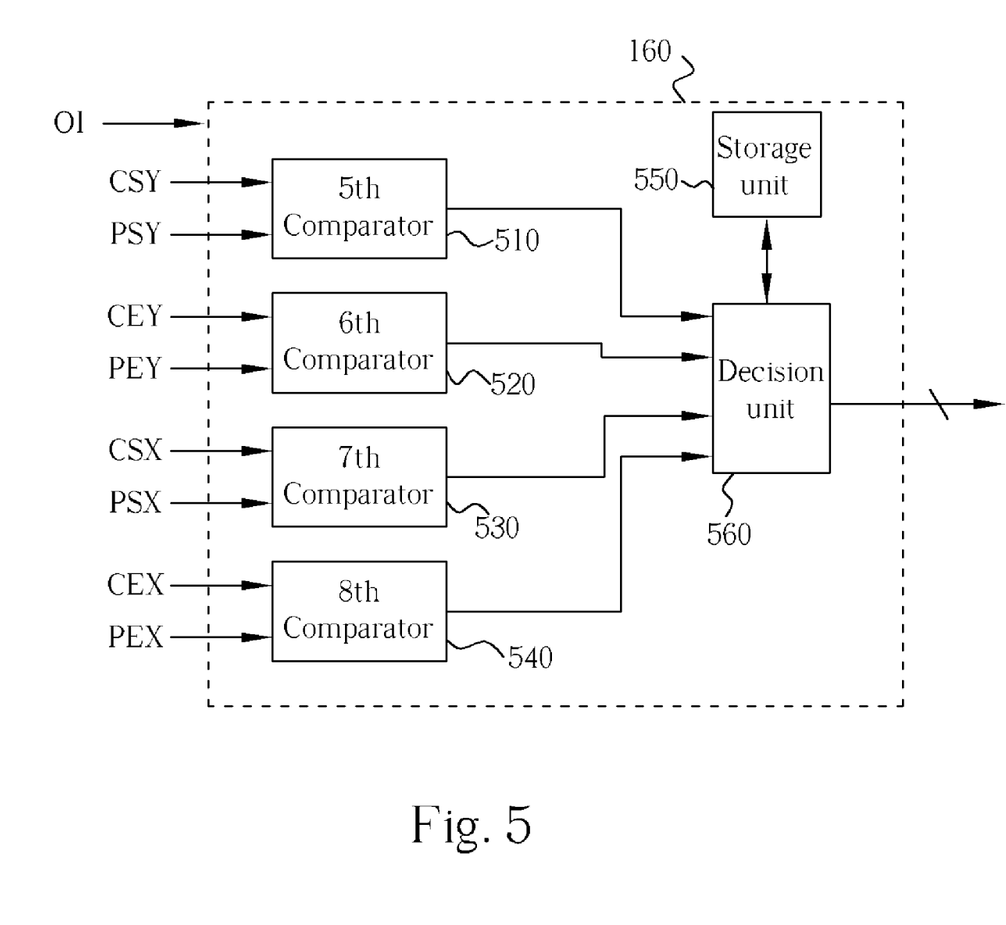
FIG. 5 is a block diagram of an area divider of FIG. 1 in accordance with the present invention.

Please refer to FIG. 4 and FIG. 5. FIG. 4 is a diagram illustrating 16 overlap schemes between the current search range CR and the previous search range PR. FIG. 5 is block a diagram of the area divider 160 according to one embodiment of the present invention. In this embodiment, the area divider 160 operates when the overlap indicating signal OI indicates the overlap portion of the current search range CR and the previous search range PR exists. The area divider 160 of this embodiment includes a $5^{th}$ comparator 510 for comparing the upper boundary CSY with the upper boundary PSY; a $6^{th}$ comparator 520 for comparing the lower boundary CEY with the lower boundary PEY; a $7^{th}$ comparator 530 for comparing the left boundary CSX with the left boundary PSX; a $8^{th}$ comparator 540 for comparing the right boundary CEX with the right boundary PEX; a storage unit 550 for storing a plurality of determination conditions and dividing rules used for determining the overlap schemes (see 4A-4P in FIG. 4); and a decision unit 560 for identifying the non-overlap portion between the two search ranges according to the comparing results of the comparators, and the determination conditions and the dividing rules of the non-overlap portion stored in the storage unit 550, and for dividing the non-overlap portion into at least one sub-block.

Figure 6:
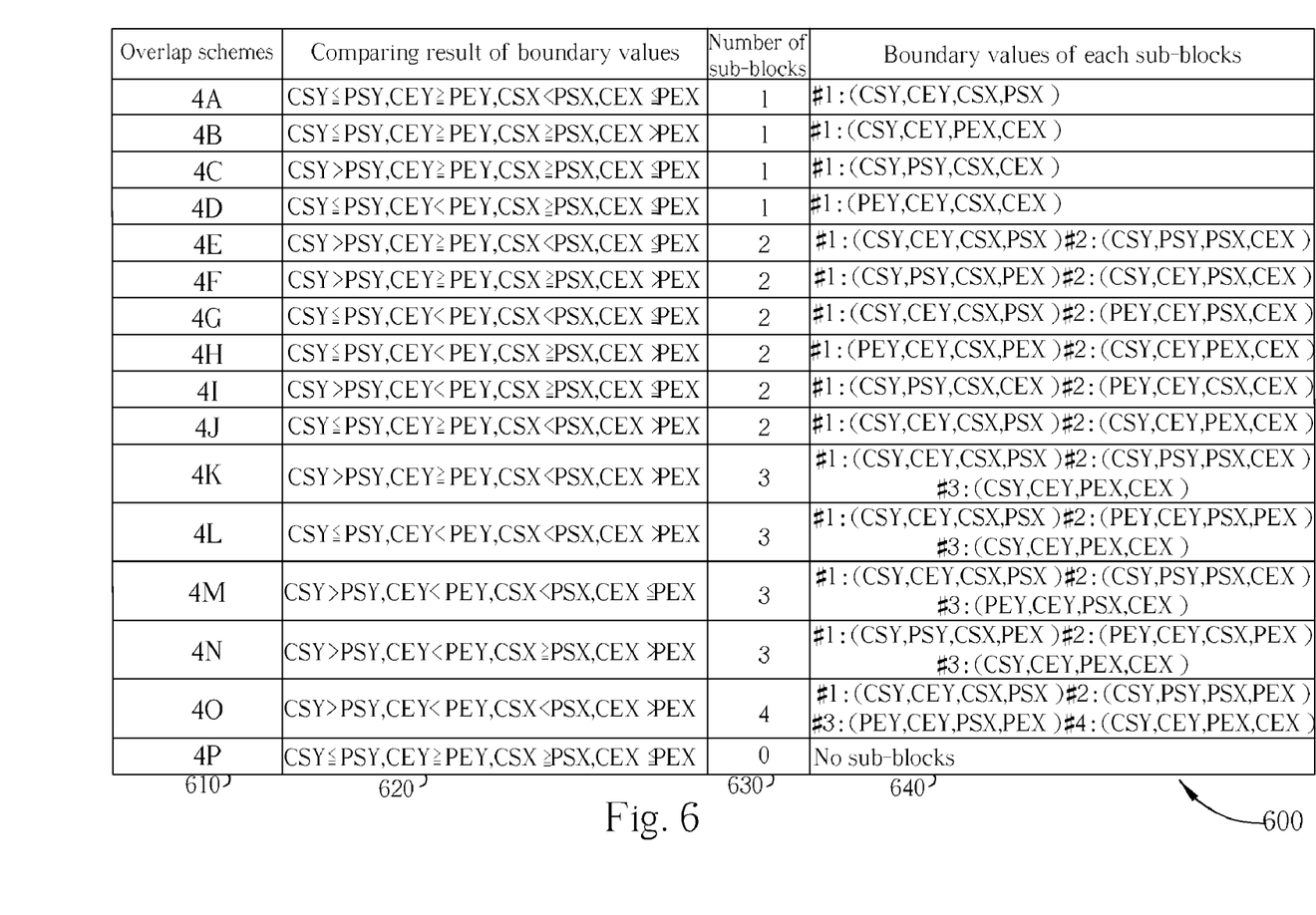
FIG. 6 is a diagram illustrating a table recorded in a storage unit of FIG. 5 according to an exemplary embodiment of the present invention.

FIG. 6 is a diagram illustrating a table 600 stored in the storage unit 550 according to one exemplary embodiment of the present invention. In this embodiment, if the comparing results of the comparators 510, 520, 530, 540 in the area divider 160 shows that CSY equals to PSY, CEY is greater than PEY, CSX is smaller than PSX and CEX is greater than PEX, the decision unit 560 will determine that the overlap scheme between the current search range CR and the previous search range PR belongs to the overlap scheme 4J according to the content of the column 620 of the table 600. Further, the decision unit 560 divides the non-overlap portion into 2 sub-blocks according to the non-overlap dividing rules in the column 630 and 640, which correspond to the overlap scheme 4J. As shown, the four boundary values, the upper, lower, left, and right boundaries, of the sub-block #1 are set as CSY, CEY, CSX, and PSX, respectively. In addition, the four boundary values, the upper, lower, left, and right boundaries, of the sub-block #2 are set as CSY, CEY, PEX, and CEX, respectively. The decision unit 560 will transmit the boundary values of the sub-block #1, #2 to the loading module 170. The loading module 170 will read the image data corresponding to the sub-block #1, #2 sequentially from the system memory 10 and load the image data into the storage medium 130 for performing the block matching operation by the block-matching module 140.

In other words, the area divider 160 compares the boundary values of the current search range CR and the previous search range of the same boundary side and divides the non-overlap portion according to the comparing results. It should be appreciated by those of ordinary skill in the art that the determination conditions for use in the determination of overlap schemes and associated dividing rules stored in the table 600 are merely examples rather than limitations of practical applications. In practice, other design choices that can achieve the same purpose may also be employed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for loading image data required by a motion estimation into a single storage medium, comprising:
   determining if an overlap portion between a current search range and a previous search range exists; and
   if the overlap portion exists,
      keeping image data corresponding to the overlap portion stored in only the single storage medium, wherein the kept data is not moved to other storage media as a part of the motion estimation process;
      identifying a non-overlap portion between the current search range and the previous search range;
      dividing the identified non-overlap portion, and without taking into account the overlap portion, into at least one sub-block; and
      loading image data corresponding to each sub-block into the single storage medium for the motion estimation.

2. The method of claim 1, further comprising:
   comparing a first boundary of the current search range with a second boundary of the previous search range to determine the existence of the overlap portion;
   wherein the first and second boundaries correspond to opposite boundary sides.

3. The method of claim 1, wherein the step of dividing the identified non-overlap portion comprises:
   comparing a first boundary of the current search range with a second boundary of the previous search range to generate a comparing result; and
   dividing the identified non-overlap portion according to the comparing result;
   wherein the first and second boundaries correspond to the same boundary side.

4. The method of claim 3, further comprising:
   providing a table for recording a plurality of dividing rules;
   selecting a dividing rule corresponding to the identified non-overlap portion from the table according to the comparing result; and
   dividing the identified non-overlap portion according to the selected dividing rule.

5. A data-loading device of a motion estimation device, the data-loading device capable of loading image data into a single storage medium of the motion estimation device, the data-loading device comprising:
   an overlap detector for determining if an overlap portion between a current search range and a previous search range exists;
   an area divider coupled to the overlap detector for dividing a non-overlap portion, and without taking into account the overlap portion, between the current search range and the previous search range into at least one sub-block if the overlap portion exists; and
   a loading module coupled to the area divider and the single storage medium for loading image data corresponding to each sub-block into the single storage medium, and for keeping image data corresponding to the overlap portion to remain in only the single storage medium, wherein the kept data is not moved to other storage media as a part of the motion estimation process.

6. The data-loading device of claim 5, further comprising:
   a register coupled to the overlap detector for buffering boundaries of the previous search range.

7. The data-loading device of claim 5, wherein the overlap detector compares a first boundary of the current search range with a second boundary of the previous search range for determining whether the overlap portion exists or not; and the first and second boundaries correspond to opposite boundary sides.

8. The data-loading device of claim 5, wherein the overlap detector comprises:
   a comparator for comparing a first boundary of the current search range with a second boundary of the previous search range to determine if the current search range overlaps the previous search range.

9. The data-loading device of claim 8, wherein the overlap detector further comprises:
   a logic unit coupled to the comparator for outputting an overlap indicating signal to indicate the existence of the overlap portion between the current search range and the previous search range according to a comparing result outputted from the comparator.

10. The data-loading device of claim 5, wherein the area divider compares a first boundary of the current search range with a second boundary of the previous search range and divides the non-overlap portion according to a comparing result; and the first and second boundaries correspond to the same boundary side.

11. The data-loading device of claim 10, wherein the area divider further comprises:
    a comparator for comparing the first boundary with the second boundary; and
    a decision unit coupled to the comparator for dividing the non-overlap portion according to a comparing result outputted from the comparator.

12. A method for loading image data required by a motion estimation, comprising:
    determining if an overlap portion between a current search range and a previous search range exists;
    if the overlap portion exists, identifying a non-overlap portion between the current search range and the previous search range;
    loading into a single storage medium image data corresponding to a portion of the current search range for the motion estimation, wherein the portion includes only the non-overlap portion; and
    keeping image data corresponding to the overlap portion stored in only the single storage medium, wherein the kept data is not moved to other storage media as a part of the motion estimation process.

13. The method of claim 12, further comprising:
    dividing the non-overlap portion into at least one sub-block; and
    loading image data corresponding to each sub-block for the motion estimation.

14. The method of claim 13, wherein the step of dividing the non-overlap portion comprises:

comparing a first boundary of the current search range with a second boundary of the previous search range to generate a comparing result; and dividing the non-overlap portion according to the comparing result;

the first and second boundaries correspond to the same boundary side.

15. The method of claim 12, further comprising:

comparing a first boundary of the current search range with a second boundary of the previous search range to determine the existence of the overlap portion;

wherein the first and second boundaries correspond to opposite boundary sides.

16. A data-loading device of a motion estimation device for loading image data into a single storage medium, comprising:

an overlap detector for determining if an overlap portion between a current search range and a previous search range exists;

an area divider coupled to the overlap detector for dividing only a non-overlap portion between the current search range and the previous search range if the overlap portion exists; and a loading module coupled to the area divider and the single storage medium for loading image data corresponding to a portion of the current search range into the single storage medium, wherein the portion includes the non-overlap portion, and for keeping image data corresponding to the overlap portion to remain in only the single storage medium, wherein the kept data is not moved to other storage media as a part of the motion estimation process.

17. The data-loading device of claim 16, further comprising:

a register coupled to the overlap detector for buffering the boundary information of the previous search range.

18. The data-loading device of claim 16, wherein the overlap detector compares a first boundary of the current search range with a second boundary of the previous search range for determining whether the current search range overlaps the previous search range or not; and the first and second boundaries correspond to opposite boundary sides.

19. The data-loading device of claim 16, wherein the area divider divides the non-overlap portion between the current search range and the previous search range into at least one sub-block, and the loading module loads image data corresponding to the sub-block into the single storage medium.

20. The data-loading device of claim 19, wherein the area divider compares a third boundary of the current search range with a fourth boundary of the previous search range and divides the non-overlap portion according to a comparing result; and the third and fourth boundaries correspond to the same boundary side.

* * * * *